United States Patent
Koike et al.

(10) Patent No.: US 8,126,060 B2
(45) Date of Patent: Feb. 28, 2012

(54) MOTION VECTOR DETECTION DEVICE AND MOTION VECTOR DETECTING METHOD

(75) Inventors: Yuichiro Koike, Tokyo (JP); Takuro Takahashi, Tokyo (JP)

(73) Assignee: NTT Electronics Corporation (JP)

( * ) Notice: Subject to any disclaimer, the term of this patent is extended or adjusted under 35 U.S.C. 154(b) by 880 days.

(21) Appl. No.: 12/278,137

(22) PCT Filed: Jan. 31, 2007

(86) PCT No.: PCT/JP2007/051558
§ 371 (c)(1),
(2), (4) Date: Aug. 1, 2008

(87) PCT Pub. No.: WO2007/091459
PCT Pub. Date: Aug. 16, 2007

(65) Prior Publication Data
US 2009/0174819 A1    Jul. 9, 2009

(30) Foreign Application Priority Data
Feb. 10, 2006    (JP) ................................ P2006-033193

(51) Int. Cl.
*H04N 7/18*    (2006.01)
(52) U.S. Cl. .............................. 375/240.17; 375/240.16
(58) Field of Classification Search .................. 348/699; 382/236; 375/240.16–240.17
See application file for complete search history.

(56) References Cited

U.S. PATENT DOCUMENTS

| | | | |
|---|---|---|---|
| 5,369,449 A | 11/1994 | Yukitake et al. | |
| 5,412,435 A | 5/1995 | Nakajima | |
| 5,701,160 A | 12/1997 | Kimura et al. | |
| 6,249,612 B1 * | 6/2001 | Ogura | 382/236 |

FOREIGN PATENT DOCUMENTS

| | | |
|---|---|---|
| JP | 06-030395 A | 2/1994 |
| JP | 06-078298 A | 3/1994 |
| JP | 08-037662 A | 2/1996 |
| JP | 09-130808 A | 5/1997 |
| JP | 2005-210321 A | 8/2005 |

OTHER PUBLICATIONS

Office Action, Chinese Patent Application No. 2007800045208, mailed May 3, 2011.

* cited by examiner

*Primary Examiner* — Andy Rao
(74) *Attorney, Agent, or Firm* — Kikpatrick Townsend & Stockton LLP (57) ABSTRACT

It is an object to reduce an amount of calculation for motion vector detection and to prevent degradation in image quality. A motion vector detection device (1) includes a first motion vector extraction circuit (142) to extract a predetermined reduced number of first motion vectors from multiple first motion vectors detected by a first motion vector detection circuit (141), and a selection circuit (143) to select the multiple first motion vectors or the extracted first motion vectors.

4 Claims, 5 Drawing Sheets

MOTION VECTOR DETECTION DEVICE AND MOTION VECTOR DETECTING METHOD

This application is a national stage of PCT/JP07/051,558 filed Jan. 31, 2007, which is hereby incorporated by reference.

TECHNICAL FIELD

The present invention relates to a motion vector detection device and a motion vector detecting method for detecting a motion vector used for encoding video data.

BACKGROUND ART

In recent years, recording video data into recording media such as CDs and DVDs and reading and reproducing the recorded data if needed have been widely practiced.

As an amount of video data is enormous, data compression by encoding is generally performed in the case of recording the data on the recording media.

As an encoding method for the video data, there is inter-frame prediction coding to generate a predicted image by using a motion vector detected from an encoding target image and an image temporally before or after this encoding target image, and to encode a difference between the encoding target image and this predicted image in accordance with the MPEG standard.

In order to reduce an amount of calculation for motion vector detection, Japanese Patent Laid-Open No. H09-65340 discloses a technique in which motion vectors having small distortion are selected from multiple motion vectors detected with low pixel accuracy and then motion vectors with high pixel accuracy are detected based on the selected motion vectors, for example.

By utilizing this technique, in the process of inter-frame prediction coding, it is possible to reduce the number of motion vectors to be detected with high pixel accuracy from 8 to 4 in the case of generating a B picture or to reduce from 4 to 2 in the case of generating a P picture.

As a consequence, it is possible to reduce the amount of image data to be outputted for performing detection with high pixel accuracy as well as the amount of calculation for detecting second motion vectors, thereby reducing a load on a motion vector detection device.

However, when the second motion vectors in the inter-frame prediction coding are detected by using the technique disclosed in Japanese Patent Laid-Open No. H09-65340 described above, a less number of fields are referenced. This may bring about a problem of degrading the image quality.

In Particular, when the P picture is generated as the predicted image, there is a problem of substantial degradation of the image quality because the number of frames to be referenced in the second motion vector detection is 2.

DISCLOSURE OF INVENTION

An object of the present invention is to provide a motion vector detection device configured to reduce an amount of calculation for detecting motion vectors and to prevent degradation in image quality, and a motion vector detecting method.

A motion vector detection device of a first aspect of the present invention is a motion vector detection device to detect a motion vector for generating a predicted image used for inter-frame prediction coding of an interlaced image, including: a first motion vector detection circuit configured to detect, with accuracy of one pixel unit or more, a motion vector between a top field of an encoding target image and a top field of a reference image, a motion vector between the top field of the encoding target image and a bottom field of the reference image, a motion vector between a bottom field of the encoding target image and the top field of the reference image, and a motion vector between the bottom field of the encoding target image and the bottom field of the reference image, respectively as first motion vectors; a first motion vector extraction circuit configured to extract a preset reduced number of first motion vectors from the plurality of first motion vectors detected by the first motion vector detection circuit; a selection circuit configured to select the first motion vectors from the plurality of first motion vectors detected by the first motion vector detection circuit, or the first motion vectors extracted by the first motion vector extraction circuit; and a second motion vector detection circuit configured to further detect motion vectors with accuracy of less than one pixel unit as second motion vectors based on the first motion vectors selected by the selection circuit.

A motion vector detection device of a second aspect of the present invention is the motion vector detection device of the above-described first aspect, in which the selection circuit performs any of selection of the first motion vectors for each image based on a picture type of the predicted image and selection of the first motion vectors for each macroblock or slice.

A motion vector detecting method of a third aspect of the present invention is a motion vector detecting method for detecting a motion vector for generating a predicted image used for inter-frame prediction coding of an interlaced image, causing a motion vector detection device to execute the steps including: a first motion vector detecting step of detecting, with accuracy of one pixel unit or more, a motion vector between a top field of an encoding target image and a top field of a reference image, a motion vector between the top field of the encoding target image and a bottom field of the reference image, a motion vector between a bottom field of the encoding target image and the top field of the reference image, and a motion vector between the bottom field of the encoding target image and the bottom field of the reference image, respectively as first motion vectors; a first motion vector extracting step of extracting a preset reduced number of first motion vectors from the plurality of first motion vectors detected in the first motion vector detecting step; a selecting step of selecting the first motion vectors from the plurality of first motion vectors detected in the first motion vector detecting step, or the first motion vectors extracted in the first motion vector extracting step; and a second motion vector detecting step of further detecting motion vectors with accuracy of less than one pixel unit as a second motion vector based on the first motion vectors selected in the selecting step.

A motion vector detecting method of a fourth aspect of the present invention is the motion vector detecting method of the above-described third aspect, in which any of selection of the first motion vectors for each image based on a picture type of the predicted image and selection of the first motion vectors for each macroblock or slice is performed in the selecting step.

BEST MODE FOR CARRYING OUT THE INVENTION

A motion vector detection device according to one embodiment of the present invention is configured to detect a motion vector for generating a predicted image from a reference image when encoding a video image consisting of interlaced images by using inter-frame prediction.

Figure 1:
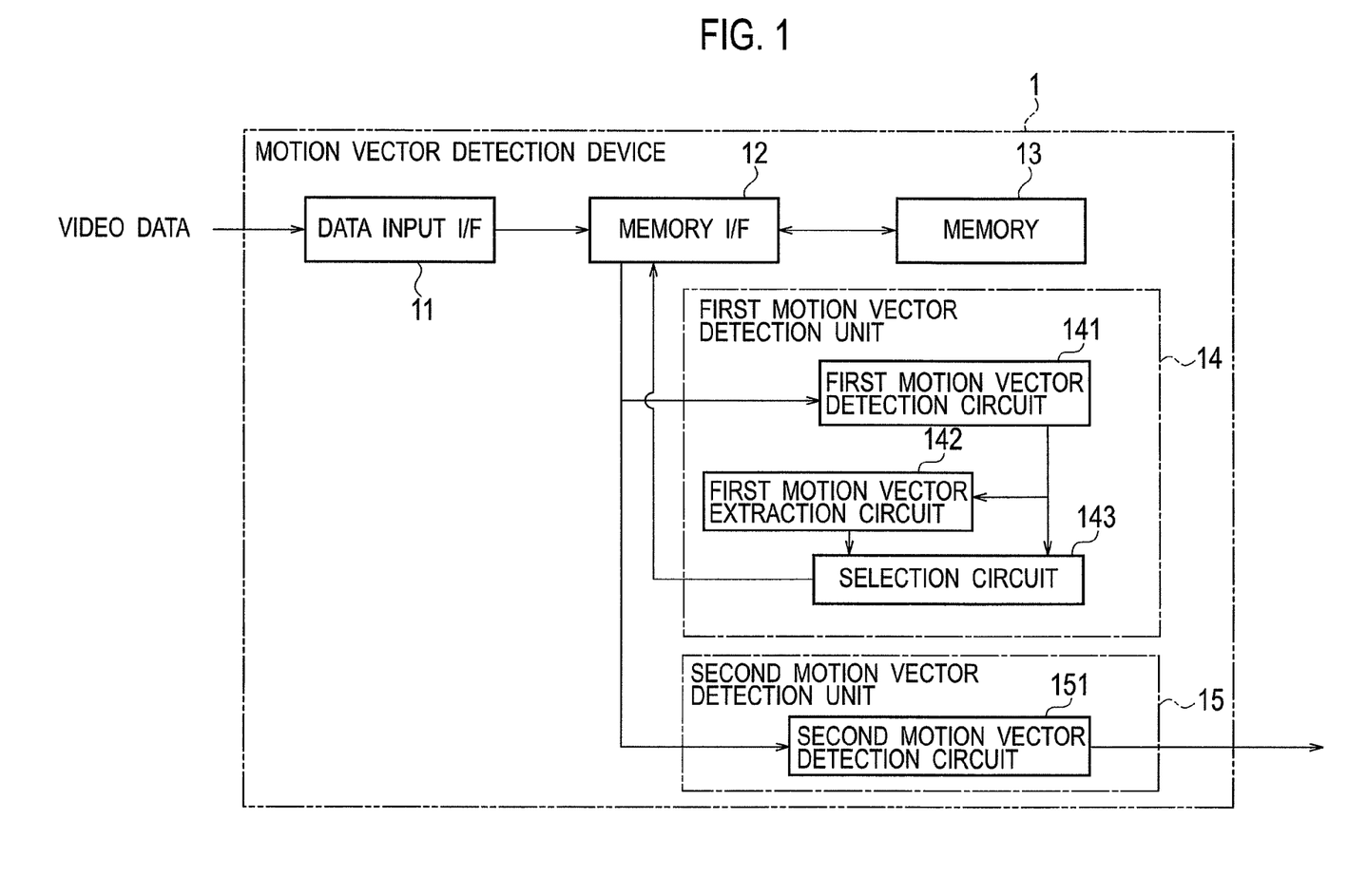
FIG. 1 is a block diagram showing a configuration of a motion vector detection device according to one embodiment of the present invention.

FIG. 1 shows a configuration of a motion vector detection device according to the present invention. In FIG. 1, a motion vector detection device 1 includes a data input I/F 11, a memory I/F 12, a memory 13, a first motion vector detection unit 14, and a second motion vector detection unit 15 provided with a second motion vector detection circuit 151.

The data input I/F 11 inputs video image data received from an external video camera or the like.

The memory I/F 12 outputs the video image data received from the data input I/F 11 to the memory 13. Moreover, the memory I/F 12 acquires desired image data out of the video image data recorded in the memory 13, and outputs the data thus acquired to the first motion vector detection unit 14 or the second motion vector detection unit 15 as needed.

The memory 13 records the video image data acquired from the memory I/F 12.

The first motion vector detection unit 14 includes a first motion vector detection circuit 141, a first motion vector extraction circuit 142, and a selection circuit 143. The first motion vector detection circuit 141 acquires encoding target image data and reference image data from the memory 13 through the memory I/F 12, detects motion vectors by performing detection in a broad range with low pixel accuracy, and outputs the motion vectors to the first motion vector extraction circuit 142 and the selection circuit 143 as first motion vectors. The low pixel accuracy is the accuracy of one pixel unit or more (for example, two pixels).

In this embodiment, an encoding target image and a reference image are interlaced images. Each interlaced image consists of a top field and a bottom field. For this reason, first motion vectors, corresponding to the top field and the bottom field of the reference image, are detected from the top field and the bottom field of the encoding target image, respectively.

Specifically, when a B picture is generated as the predicted image, the top field and the bottom field of a forward reference image are referenced by the top field and the bottom field of the encoding target image to detect the first motion vectors. At the same time, the top field and the bottom field of a backward reference image are referenced by the top field and the bottom field of the encoding target image to detect the first motion vectors. Accordingly, 8 pieces of the first motion vectors are detected.

Meanwhile, when a P picture is generated as the predicted image, the top field and the bottom field of the forward reference image are referenced by the top field and the bottom field of the encoding target image to detect the first motion vectors. Accordingly, 4 pieces of the first motion vectors are detected.

Thus, the number of the first motion vectors to be detected, as the predicted image, by the first motion vector detection circuit 141 is 8 in the case of generating the B picture or 4 pieces in the case of generating the P picture.

The first motion vector extraction circuit 142 acquires the first motion vectors from the first motion vector detection circuit 141, then extracts the preset number of first motion vectors out of the acquired first motion vectors, and output them to the selection circuit 143. In this embodiment, assume that 4 pieces of the first motion vectors are extracted from the acquired first motion vectors in the case of generating the B picture while 2 pieces of the first motion vectors are extracted from the acquired first motion vectors in the case of generating the P picture.

The selection circuit 143 acquires the first motion vectors from the first motion vector detection circuit 141 and the first motion vector extraction circuit 142. Then, the selection circuit 143 selects 4 pieces of the first motion vectors acquired from the first motion vector extraction circuit 142 in the case of generating the B picture as the predicted image or selects 4 pieces of the first motion vectors acquired from the first motion vector detection circuit 141 in the case of generating the P picture as the predicted image. Moreover, the selection circuit 143 outputs the selected first motion vectors to the memory I/F 12.

The memory I/F 12 respectively acquires macroblock reference image data pieces each defining coordinates of the reference image indicated by the acquired first motion vectors as the point of origin, and outputs the acquired data to the second motion vector detection unit 15 together with encoding target image data.

The second motion vector detection circuit 151 of the second motion vector detection unit 15 acquires the encoding target image data and the macroblock reference image data from the memory I/F 12, then detects the motion vectors with high pixel accuracy, and outputs the detected motion vectors as second motion vectors. The high pixel accuracy is the accuracy of less than one pixel unit (for example, half pixel).

Next, operations of detecting the motion vectors for encoding the inputted video data by using the motion vector detection device of this embodiment will be described with reference to FIG. 1 to FIG. 4.

Figure 2:
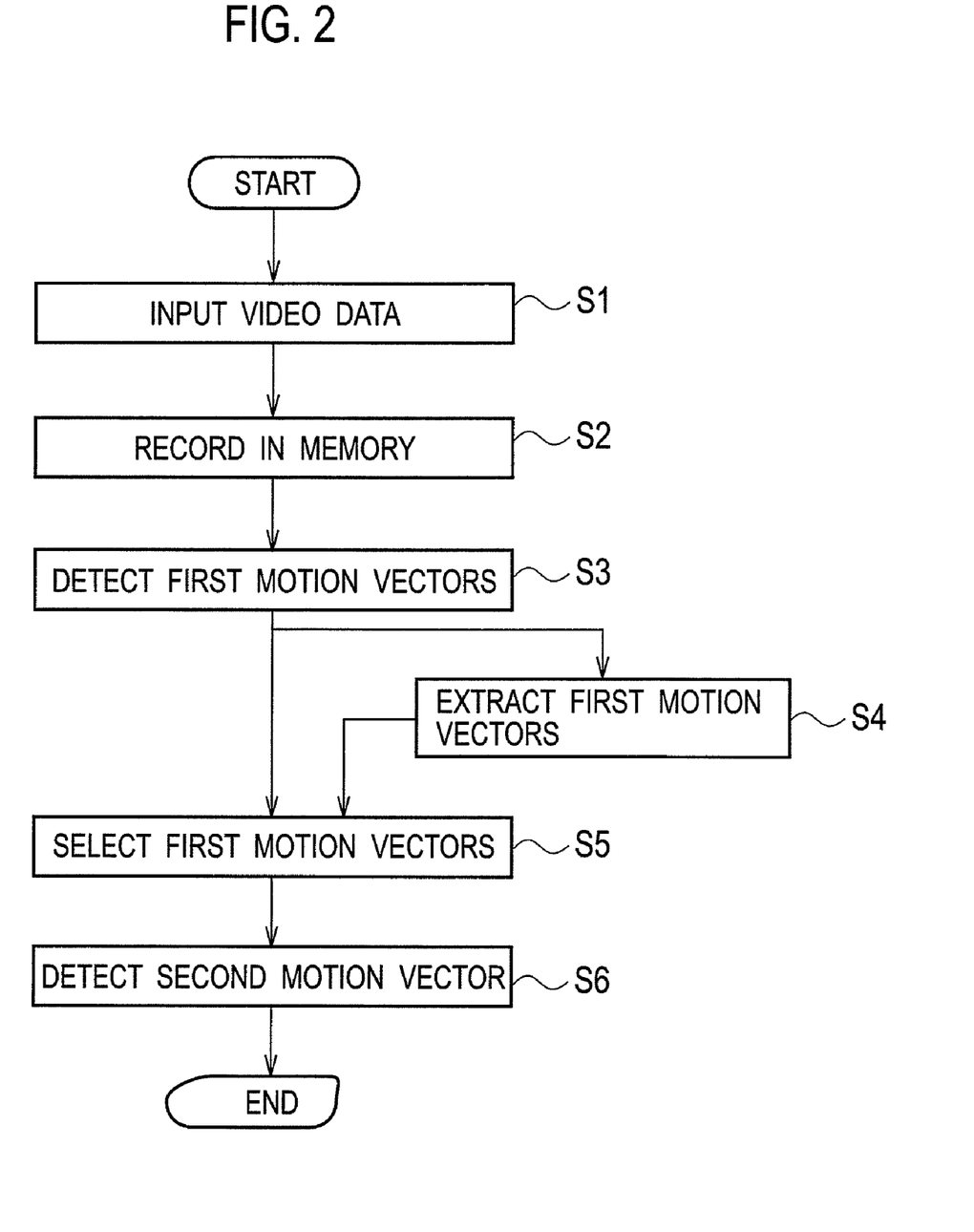
FIG. 2 is a flowchart showing operations of the motion vector detection device according to the one embodiment of the present invention.

First, the video data transmitted from the external video camera or the like is inputted from the data input I/F 11 (S1).

The video data inputted from the data input I/F 11 is recorded in the memory 13 through the memory I/F 12 (S2).

Next, the memory I/F 12 reads, from the memory 13, the image data to be encoded in the video data. Thereafter, when the predicted image to be generated is any of the B picture or the P picture, the memory I/F 12 further reads the reference image data from the memory 13.

The encoding target image data and the reference image data read from the memory I/F 12 are outputted to the first motion vector detection circuit 141 of the first motion vector detection unit 14.

The first motion vector detection circuit 141 performs a search in a broad range of the reference image data with low pixel accuracy based on the acquired encoding target image data and detects the first motion vectors (S3).

As described previously, in this embodiment, the encoding target image and the reference image are the interlaced images, and each of the images consists of the top field and the bottom field. For this reason, the top field and the bottom field constituting the reference image are referenced by the top field and the bottom field constituting the encoding target image, respectively, to thereby detect the first motion vectors.

Figure 3:
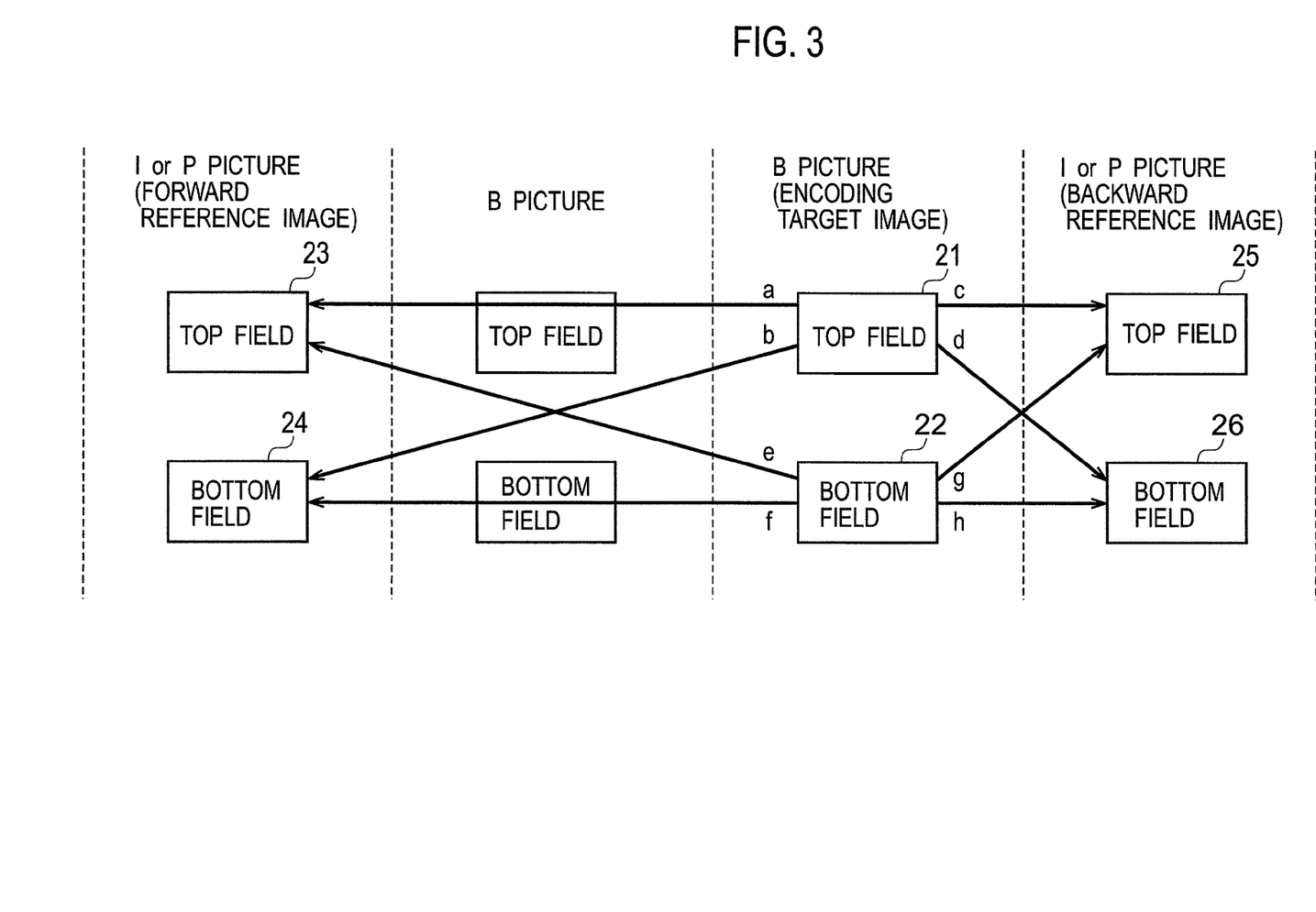
FIG. 3 is an explanatory view showing relations between an encoding target image and reference images in the case of generating a B picture with the motion vector detection device according to the one embodiment of the present invention.

Detection of the first motion vectors in the case where the B picture is generated as the predicted image will be described with reference to FIG. 3.

When the B picture is generated, a forward and backward reference images are referenced by the encoding target image. As shown in FIG. 3, a first motion vector a is detected by referencing a top field 23 of the forward reference image from a top field 21 of the encoding target image; a first motion vector b is detected by referencing a bottom field 24 of the forward reference image from the top field 21 of the encoding target image; a first motion vector c is detected by referencing a top field 25 of the backward reference image from the top field 21 of the encoding target image; and a first motion vector d is detected by referencing a bottom field 26 of the backward reference image from the top field 21 of the encoding target image.

In addition, a first motion vector e is detected by referencing the top field 23 of the forward reference image from a bottom field 22 of the encoding target image; a first motion vector f is detected by referencing the bottom field 24 of the forward reference image from the bottom field 22 of the encoding target image; a first motion vector g is detected by referencing the top field 25 of the backward reference image from the bottom field 22 of the encoding target image; and a first motion vector h is detected by referencing the bottom field 26 of the backward reference image from the bottom field 22 of the encoding target image.

When these first motion vectors a to h are detected, the motion vectors each of which minimizes the sum of absolute differences are detected for the respective referenced fields.

In this way, 8 pieces of the first motion vectors a to h are detected as the first motion vectors when the B picture is generated, and are outputted to the first motion vector extraction circuit 142 and the selection circuit 143.

When acquiring 8 pieces of the first motion vectors a to h, the first motion vector extraction circuit 142 extracts a given predetermined number (4 pieces in this embodiment) of the first motion vectors (S4). To be more precise, the first motion vector extraction circuit 142 extracts the first motion vector having the smallest sum of absolute differences from the first motion vectors obtained by referencing the reference image in the same direction from the same field of the encoding target image.

Specifically, the first motion vector extraction circuit 142 extracts: one from the first motion vector a and the first motion vector b; one from the first motion vector c and the first motion vector d; one from the first motion vector e and the first motion vector f; and one from the first motion vector g and the first motion vector h.

In this way, 4 pieces of the first motion vectors are extracted in this embodiment, and 4 pieces of the extracted first motion vectors are outputted to the selection circuit 143.

Figure 4:
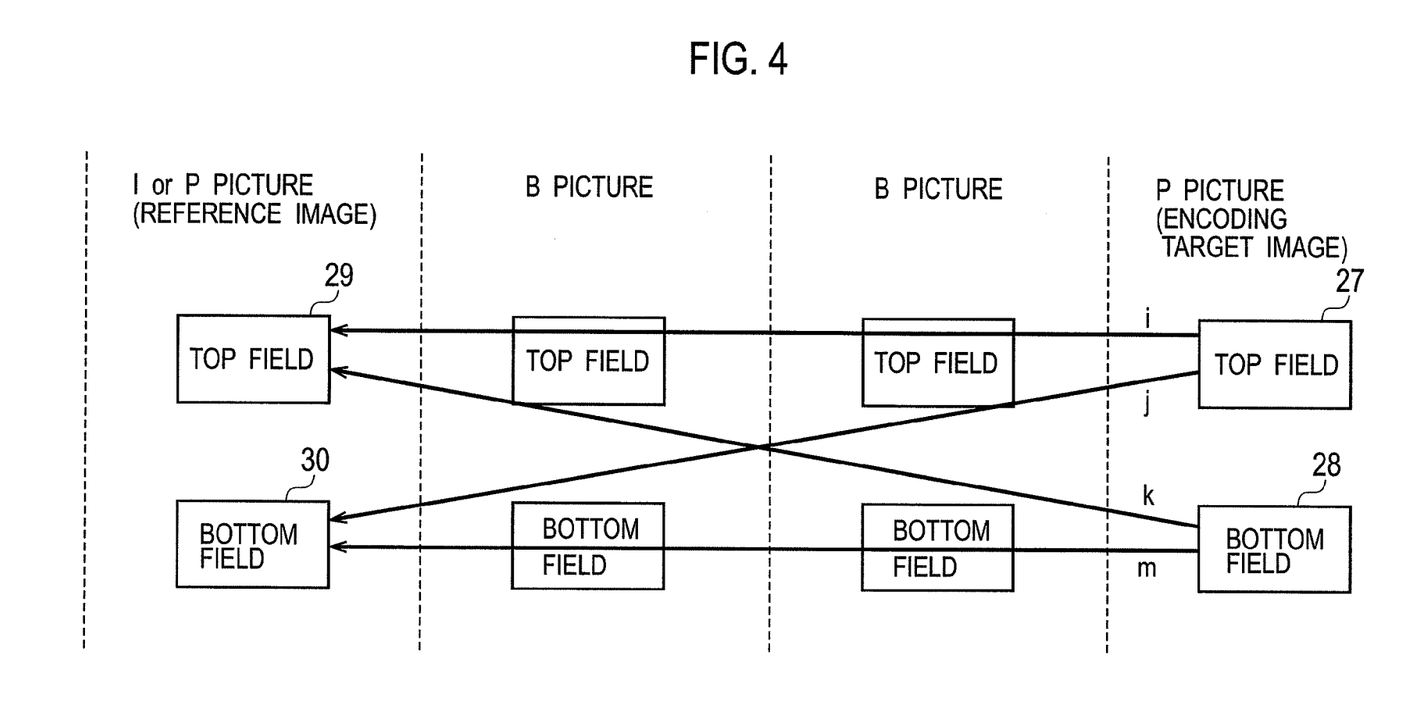
FIG. 4 is an explanatory view showing relations between the encoding target image and the reference image in the case of generating a P picture with the motion vector detection device according to the one embodiment of the present invention.

Next, detection of the first motion vectors in the case where the P picture is generated as the predicted image will be described with reference to FIG. 4.

When the P picture is generated, a forward reference image is referenced by the encoding target image. As shown in FIG. 4, a first motion vector i is detected by referencing a top field 29 of the reference image from a top field 27 of the encoding target image; a first motion vector j is detected by referencing a bottom field 30 of the reference image from the top field 27 of the encoding target image.

In addition, a first motion vector k is detected by referencing the top field 29 of the reference image from a bottom field 28 of the encoding target image; a first motion vector m is detected by referencing the bottom field 30 of the reference image from the bottom field 28 of the encoding target image.

When these first motion vectors i to m are detected, the motion vectors each of which minimizes the sum of absolute differences are detected for the respective referenced fields.

In this way, 4 pieces of the first motion vectors i to m are detected as the first motion vectors when the P picture is generated, and are outputted to the first motion vector extraction circuit 142 and the selection circuit 143.

When acquiring 4 pieces of the first motion vectors i to m, the first motion vector extraction circuit 142 extracts a given predetermined number (2 pieces in this embodiment) of the first motion vectors (S4). To be more precise, the first motion vector extraction circuit 142 extracts the first motion vector having the smallest sum of absolute differences from the first motion vectors obtained by referencing the reference image from the same field of the encoding target image.

Specifically, the first motion vector extraction circuit 142 extracts one from the first motion vector i and the first motion vector j, and one from the first motion vector k and the first motion vector m.

In this way, 2 pieces of the first motion vectors are extracted in this embodiment, and 2 pieces of the extracted first motion vectors are outputted to the selection circuit 143.

The selection circuit 143 selects the first motion vectors to be used for generation of the predicted image from the first motion vectors acquired from the first motion vector detection circuit 141 and from the first motion vector extraction circuit 142 (S5).

In this embodiment, the selection circuit 143 selects 4 pieces of the first motion vectors acquired from the first motion vector extraction circuit 142 in the case where the B picture is generated as the predicted image, and selects 4 pieces of the first motion vectors acquired from the first motion vector detection circuit 141 in the case where the P picture is generated as the predicted image.

The selection circuit 143 adds a 1-bit signal s, indicating the location from which the motion vector is acquired, to each of the selected first motion vectors and outputs them to the memory I/F 12. The 1-bit signal s indicating the acquired location is configured to indicate whether it is the first motion vector acquired from the first motion vector detection circuit 141 or it is the first motion vector acquired from the first motion vector extraction circuit 142. Here, in this embodiment, 4 pieces of the first motion vectors are outputted to the memory I/F 12 in the case where the B picture is generated and where the P picture is generated.

The memory I/F 12 carves out macroblock reference image data pieces in predetermined sizes previously set by the respective fields of the reference images while defining the coordinates indicated by the respective acquired first motion vectors as the origins.

Here, the memory I/F 12 judges the number of the first motion vectors based on the signal s acquired from the selection circuit 143.

The 4 pieces of the carved macroblock reference image data pieces are each outputted to the second motion vector detection circuit 151 of the second motion vector detection unit 15 together with the encoding target image data and the signal s.

The second motion vector detection circuit 151 judges the number of the acquired macroblock reference image data pieces by using the signal s and acquires the encoding target image data and the macroblock reference image data.

When the second motion vector detection circuit 151 acquires the encoding target image data and the macroblock reference image data, the motion vector is detected for each of the macroblock reference image data pieces with high pixel accuracy (for example, half-pixel accuracy) than that in the detection of the motion vectors by the first motion vector detection unit 14 (S6).

The 4 pieces of the detected motion vectors are outputted as the second motion vectors and used for generation of the B picture or the P picture. In this way, by detecting the second motion vectors, it is possible to perform the inter-frame prediction coding on the interlaced images.

Next, a motion vector detection device of a comparative example will be described.

Figure 5:
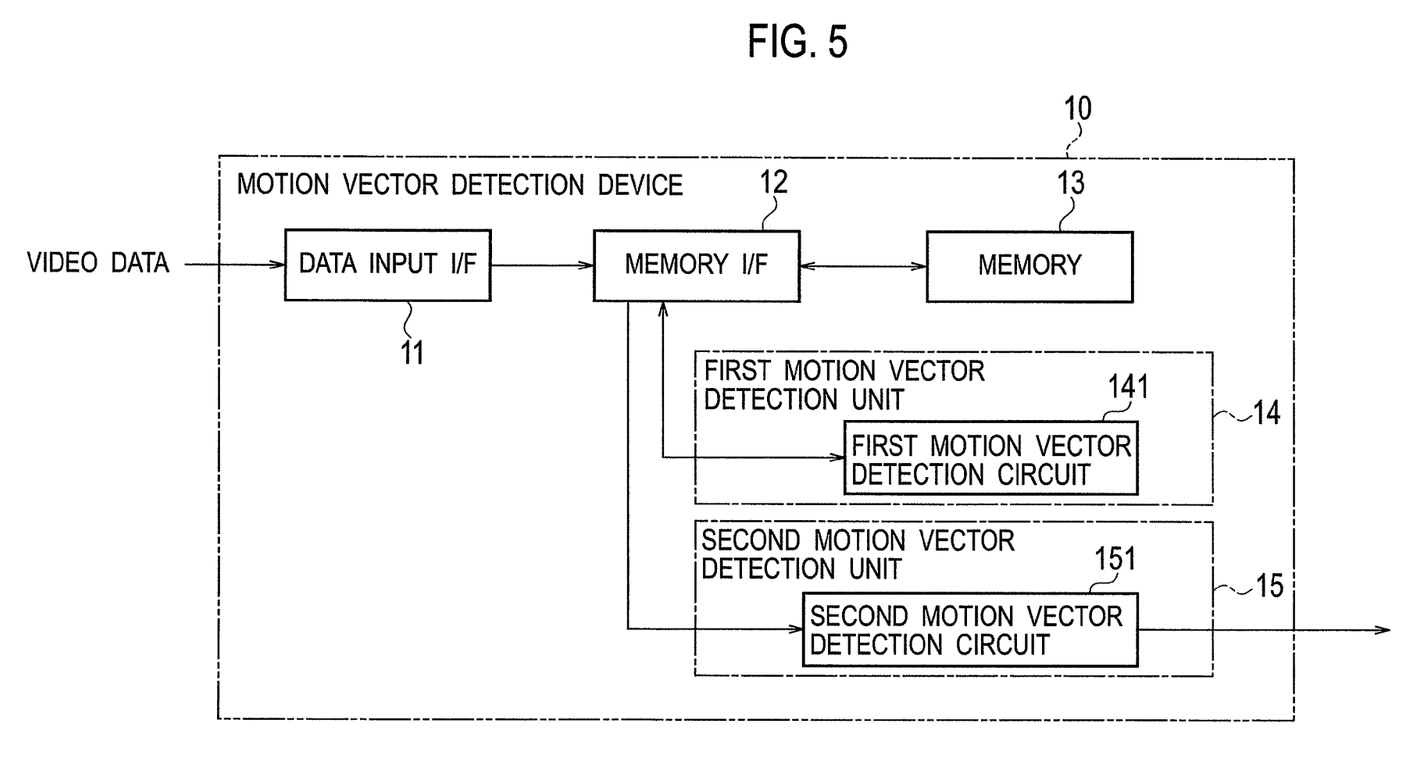
FIG. 5 is a block diagram showing a configuration of a motion vector detection device of a comparative example.

FIG. 5 is a block diagram showing a motion vector detection device 10 of the comparative example. The motion vector detection device 10 shown in FIG. 5 includes a data input I/F 11, a memory I/F 12, a memory 13, a first motion vector detection unit 14 provided with a first motion vector detection circuit 141, and a second motion vector detection unit 15 provided with a second motion vector detection circuit 151.

A case where the motion vectors of the interlaced images are detected by this motion vector detection device 10 will be described.

First, when video data is inputted from a video camera or the like to the data input I/F 11, the video data is recorded in the memory 13 through the memory I/F 12.

Next, the first motion vector detection circuit 141 of the first motion vector detection unit 14 acquires the encoding target image data and the reference image data to be used for reference in order to detect the motion vectors from the video data recorded in the memory 13.

Next, the first motion vector detection circuit 141 detects the first motion vectors with low pixel accuracy (for example, two-pixel accuracy) by using the encoding target image data and the reference image data thus acquired.

Since the encoding target image and the reference image are the interlaced images, the number of the first motion vectors to be detected by the first motion vector detection circuit 141 is 8 in the case of generating the B picture as the predicted image or 4 in the case of generating the P picture as the predicted image.

The respective first motion vectors detected by the first motion vector detection circuit 141 are outputted to the memory I/F 12.

The memory I/F 12 respectively acquires the macroblock reference image data pieces each defining coordinates of the reference image indicated by the acquired first motion vectors as the origin, and outputs them to the second motion vector detection unit 15 together with the encoding target image data.

Next, the second motion vector detection circuit 151 of the second motion vector detection unit 15 detects the second motion vectors with high pixel accuracy (for example, half-pixel accuracy) from the macroblock reference image data and the encoding target image data thus acquired.

Here, 8 pieces of the block images are acquired in the case where the B picture is generated as the predicted image. Accordingly, 8 pieces of the second motion vectors with high pixel accuracy are also detected.

Meanwhile, 4 pieces of the block images are acquired in the case where the P picture is generated as the predicted image. Accordingly, 4 pieces of the second motion vectors with high pixel accuracy are also detected.

In the motion vector detection device 10 of the comparative example shown in FIG. 5, the macroblock reference image data pieces are carved out and the second motion vectors are further detected on the basis of all the detected first motion vectors.

For this reason, in the motion vector detection device 10 of the comparative example, the amount of data to be outputted to the second motion vector detection unit 15 becomes enormous, and the amount of calculation by the second motion vector detection unit 15 also becomes large. Thus, a load on the motion vector detection device 10 of the comparative example is large.

On the contrary, according to the motion vector detection device 1 (see FIG. 1) of this embodiment, 4 pieces of the macroblock reference image data to be outputted to the second vector detection unit are retained in the case of generating the P picture while 8 pieces of the macroblock reference image data to be outputted to the second vector detection unit are reduced from 8 pieces to the given number (4 pieces) in the case of generating the B picture. In this way, it is possible to prevent degradation in image quality, to reduce the amount of data to be outputted to the second motion vector detection unit as well as the amount of calculation by the second motion vector detection unit, and thereby to reduce the load on the motion vector detection device. In essence, it is possible to reduce the amount of calculation for detecting the motion vectors while preventing degradation in the image quality.

Meanwhile, the selection circuit of this embodiment selects the first motion vectors for each image based on the picture type of the predicted image. However, since the encoding is performed on the macroblock basis, it is also possible to select the first motion vectors acquired from the first motion vector extraction circuit or the first motion vectors acquired from the first motion vector detection circuit for each macroblock or slice.

In the case where the first motion vectors are selected for each macroblock or slice (hereinafter, "macroblock, etc."), for example, it is conceivable to switch the first motion vector to be selected based on the calculation time or amount of codes necessary for the encoding for each macroblock, etc. To be more precise, it is conceivable to estimate the calculation time for each macroblock, etc. and to select the first motion vectors acquired from the first motion vector extraction circuit in the case of the macroblock, etc. for which the estimated calculation time exceeds a predetermined threshold or to select the first motion vectors acquired from the first motion vector detection circuit in the case of the macroblock, etc. for which the estimated calculation time is equal to or below the predetermined threshold.

Meanwhile, it is conceivable to estimate the amount of codes for each macroblock, etc. and to select the first motion vectors acquired from the first motion vector extraction circuit in the case of the macroblock, etc. for which the estimated amount of codes exceeds a predetermined threshold or to select the first motion vectors acquired from the first motion vector detection circuit in the case of the macroblock, etc. for which the estimated amount of codes is equal to or below the predetermined threshold. Further, it is conceivable to estimate the calculation time and amount of codes for each macroblock, etc. and to select the first motion vectors acquired from any one of the circuits based on the estimated calculation time and amount of codes.

Meanwhile, in this embodiment, all the first motion vectors detected by the first motion vector detection circuit 141 are outputted to the first motion vector extraction circuit 142 and the selection circuit 143. However, without limitations to the foregoing, it is also possible to discriminate between the case of generating the B picture and the case of generating the P picture using the first motion vector detection circuit 141, to output the first motion vectors to the first motion vector extraction circuit 142 and the selection circuit 143 only in the case of generating the B picture, and to output the first motion vectors only to the selection circuit 143 in the case of generating the P picture.

Meanwhile, the first motion vector extraction circuit of the embodiment extracts 4 pieces of the first motion vectors from 8 pieces of the first motion vectors in the case of generating the B picture, and extracts 2 pieces of the first motion vectors from 4 pieces of the first motion vectors in the case of generating the P picture. However, without limitations to the foregoing, any number can be employed as long as the number of the first motion vectors is reduced by extraction.

The invention claimed is:

1. A motion vector detection device to detect a motion vector for generating a predicted image used for inter-frame prediction coding of an interlaced image, comprising:
    a first motion vector detection circuit configured to detect, with accuracy of one pixel unit or more, a motion vector between a top field of an encoding target image and a top field of a reference image, a motion vector between the top field of the encoding target image and a bottom field of the reference image, a motion vector between a bottom field of the encoding target image and the top field of the reference image, and a motion vector between the bottom field of the encoding target image and the bottom field of the reference image, respectively as first motion vectors;
    a first motion vector extraction circuit configured to extract a preset reduced number of first motion vectors from the plurality of first motion vectors detected by the first motion vector detection circuit;
    a selection circuit configured to select the first motion vectors from the plurality of first motion vectors detected by the first motion vector detection circuit, or the first motion vectors extracted by the first motion vector extraction circuit; and
    a second motion vector detection circuit configured to further detect motion vectors with accuracy of less than one pixel unit as second motion vectors based on the first motion vectors selected by the selection circuit.

2. The motion vector detection device according to claim 1, wherein the selection circuit selects the first motion vectors for each image based on a picture type of the predicted image, or the first motion vectors for each macroblock or slice.

3. A motion vector detecting method for detecting a motion vector for generating a predicted image used for inter-frame prediction coding of an interlaced image, causing a motion vector detection device to execute the steps comprising:
    a first motion vector detecting step of detecting, with accuracy of one pixel unit or more, a motion vector between a top field of an encoding target image and a top field of a reference image, a motion vector between the top field of the encoding target image and a bottom field of the reference image, a motion vector between a bottom field of the encoding target image and the top field of the reference image, and a motion vector between the bottom field of the encoding target image and the bottom field of the reference image, respectively as first motion vectors;
    a first motion vector extracting step of extracting a preset reduced number of first motion vectors from the plurality of first motion vectors detected in the first motion vector detecting step;
    a selecting step of selecting the first motion vectors from the plurality of first motion vectors detected in the first motion vector detecting step, or the first motion vectors extracted in the first motion vector extracting step; and
    a second motion vector detecting step of further detecting motion vectors with accuracy of less than one pixel unit as a second motion vector based on the first motion vectors selected in the selecting step.

4. The motion vector detecting method according to claim 3,
    in the selecting step, selecting the first motion vectors for each image based on a picture type of the predicted image, or the first motion vectors for each macroblock or slice.

* * * * *